United States Patent Office 3,004,384
Patented Oct. 17, 1961

3,004,384
METHOD OF OPERATING A TURBOJET ENGINE WITH HIGH ENERGY FUELS
James H. Saunders, New Martinsville, W. Va., assignor to Monsanto Chemical Company, St. Louis, Mo., a corporation of Delaware
No Drawing. Filed June 7, 1956, Ser. No. 589,855
11 Claims. (Cl. 60—35.4)

This invention relates to improved high energy fuels, and particularly aviation fuels. More specifically, it relates to fuels for aircraft turbojet and turboprop engines and to an improved method of operating such engines.

One object of the invention is to provide a hydrocarbon fuel for turbojet engines of substantially increased power output per unit volume over the hydrocarbon fuels of the prior art.

Another object of the invention is to provide a hydrocarbon fuel for jet engines having a heat of combustion of from 125,000 to 160,000 and preferably from 136,000 to 150,000 B.t.u.'s per gallon.

Another object of the invention is to provide a hydrocarbon fuel for jet engines having a pour point (ASTM D97–34) not substantially above 5° C. and preferably below −20° C.

An additional object of the invention is to provide a hydrocarbon fuel for jet engines having a specific gravity from 0.85/30° C. to 1.5/30° C., and preferably from 0.90/30° C. to 1.00/30° C.

A still further object of the invention is to provide a hydrocarbon fuel for jet engines which combines in a single product all of the foregoing properties.

A still further object of the invention is to provide an improved method of operating jet engines, particularly turbojet and turboprop engines.

Other objects and advantages will become apparent to those skilled in the art as the description of the invention proceeds.

Mixtures of straight chain and/or branched chain aliphatic hydrocarbons have been and are being used as fuels for aircraft engines and while they have enjoyed a considerable amount of success, they are subject to a number of disadvantages which substantially restrict their range of utility.

One serious disadvantage of these fuels is that they have a heat of combustion of about 112,000 B.t.u.'s per gallon and no one has been able to improve this figure, that is to raise it above 112,000 B.t.u.'s per gallon and at the same time obtain the other characteristics necessary for a jet fuel. With the current trend in aircraft design, this presents a problem as to the use of such fuels in military or commercial aircraft. For example, aircraft generally, and particularly military aircraft, are being designed for higher and higher speeds. Accordingly, the wing sections are getting thinner and thinner and there is increasingly less space for storage of fuel in the wings. Consequently, these fuels are being stored in the fuselage of such aircraft. This presents a safety hazard and also a problem of maintaining the center of gravity of such aircraft and, therefore, specially designed equipment is installed to automatically and continuously alternate the use from one tank to another to maintain the center of gravity.

Another disadvantage of these fuels is that they have high vapor pressures and tend to flash off rapidly as the aircraft gains altitude. This can be overcome by pressurizing the fuel tanks, but if this is done, it is necessary to increase their structural strength which means adding weight to the aircraft. Moreover, in the case of self-sealing tanks, pressurizing does not satisfactorily solve the problem since this causes loss of protection from the self-sealing action.

It has been found that motor fuels which are free of the above described disadvantages are prepared by hydrogenating an unsaturated poly-alicyclic hydrocarbon until its specific gravity is decreased to a value in the range of about 0.85 to about 1.5 at 30° C. and preferably in the range of about 0.90 to about 1.0 at 30° C. Stated in a somewhat different manner, the unsaturated poly-alicyclic hydrocarbon mixture is hydrogenated until its heat of combustion attains a value of about 125,000 to about 160,000, and preferably about 136,000 to about 150,000 B.t.u.'s per gallon. The products thus obtained are partially or substantially completely hydrogenated depending upon the degree of unsaturation of the particular unsaturated poly-alicyclic hydrocarbon mixture employed.

As an alternative to the foregoing method, partially and/or substantially completely hydrogenated poly-alicyclic hydrocarbons may be blended to yield a hydrocarbon mixture which meets the above specifications with respect to specific gravity and heat of combustion.

The unsaturated alicyclic hydrocarbon monomers useful in making the unsaturated poly-alicyclic hydrocarbons for hydrogenation to provide the fuels of this invention embrace monomeric materials of the structure

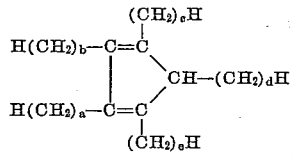

wherein $a$, $b$, $c$, $d$ and $e$ are integers from 0 to 4, inclusive. As illustrative of such monomers are cyclopentadiene, methylcyclopentadiene and its various isomeric forms, dimethylcyclopentadiene and its various isomeric forms, ethylcyclopentadiene and its various isomeric forms, and like alkyl substituted cyclopentadienes wherein the alkyl radical contains 1 to 4 carbon atoms. It is preferred that no more than two ring carbon atoms contain alkyl substituents. The polymers may be prepared by methods well known in the art and are preferably in the form of dimers. The dimers are available commercially and are readily obtained by extracting, distilling or otherwise separating same from coal tar or petroleum fractions.

As illustrative of this invention but not limitative thereof is the following:

Example 1

527 grams of a mixture of polycyclic hydrocarbons containing 67% dicyclopentadiene, 19% of cyclopentadiene-methylcyclopentadiene co-dimer and 3% methylcyclopentadiene dimer was mixed with nickel prepared from the decomposition of 100 grams of nickel formate. This product was then hydrogenated at a temperature ranging from about 27° C. to about 150° C. and under a hydrogen pressure of 300 p.s.i.g., the hydrogenation reaction taking place in a period of about 4 hours. The hydrogenated product was a clear, white, mobile liquid having the following properties:

| | |
|---|---|
| Specific gravity at 30° C. | 0.921. |
| Heat of combustion | 18,262 B.t.u.'s/lb., 140,300 B.t.u.'s/gal. |
| Pour point | −40° C. |
| Flash point (ASTM D92–33) | 62.8° C. |
| Flame point (ASTM D92–33) | 68.3° C. |
| Distillation range | 180° C.–212° C./760 mm. |

Example II 730 grams of dicyclopentadiene was mixed with the nickel obtained by decomposing 100 grams of nickel formate and the resulting mixture heated in a bomb to a maximum temperature of 215° C. for 8½ hours while under a nitrogen pressure of 100 p.s.i.g. After cooling the bomb to 150° C. the nitrogen pressure was released and hydrogen pressure (300 p.s.i.g.) applied for a period of 1½ hours while heating the reaction mixture to a temperature in the range of about 150° C. to about 170° C. The reaction product was dissolved in carbon tetrachloride and the solution filtered to separate the nickel catalyst. The solvent was then removed and the product distilled under reduced pressure and after a brief forerun at 60° C. under a pressure of 6 mm. Hg, a liquid product distilling at a temperature of about 110° C. to about 165° C./6 mm. was recovered. This liquid product was characterized by having the following properties:

Specific gravity at 30° C_____ 0.987.
Heat of combustion calculated)_____ 140,000 B.t.u.'s/gal.
Distillation range_____ 110° C. 165° C./6 mm.

The products of the instant invention are characterized by having the following combination of properties which render them eminently suitable for use as high energy fuels for aircraft engines, and particularly for turbojet engines:

(1) A heat of combustion within the range of 125,000 to 160,000 B.t.u.'s per gallon
(2) A specific gravity at 30° C. in the range of 0.85 to 1.5
(3) Low vapor pressure or high boiling point
(4) Low viscosity
(5) Low pour point
(6) Substantially no sulfur or vanadium compounds
(7) No water
(8) Burn cleanly without substantial formation of solid combustion products
(9) Uniform materials with relatively narrow boiling range
(10) Substantially free from straight chain and/or branched chain aliphatic hydrocarbons except when blended with other materials in the manner subsequently described
(11) Substantially non-corrosive
(12) Substantially non-gum forming Moreover, it will be noted from the foregoing examples that the products of this invention are markedly superior to the acyclic hydrocarbon-turbojet fuels of the prior art in that the former in many instances have lower vapor pressures and in all instances substantially higher heats of combustion than the latter. Therefore, the products of this invention are in many cases more suitable for high altitude flying and, at the same time, provide in all cases the same energy output with a smaller volume of fuel than the aliphatic hydrocarbon turbojet fuels, thus substantially eliminating the fuel storage problem and its attendant disadvantages. In addition, in many instances, the fuels of the instant invention have low pour points equivalent to or lower than present acyclic hydrocarbon turbojet fuels and hence provide another important advantage over the latter from the standpoint of cold weather and high altitude flying.

The products of this invention essentially comprise partially to substantially completely hydrogenated poly-alicyclic hydrocarbons in which the alicyclic radicals are preferably joined directly to each other or by acyclic radicals containing up to two carbon atoms. However, it is also within the broad scope of the invention to include in these products small amounts of poly-alicyclic hydrocarbons in which the alicyclic radicals are joined to each other by acyclic radicals containing from 3 to 4 carbon atoms so long as the specific gravity and heat of combustion of the product are not reduced below 0.85°/30° C. and 125,000 B.t.u.'s per gallon, respectively.

The fuels of the instant invention are eminently suitable for use in jet engines, particularly turbojet and turboprop aircraft engines.

In the operation of turbojet engines, air is withdrawn from the atmosphere into an air compressor, compressed and delivered to the combustion chamber of the engine where it is mixed with these fuels and the product ignited. The resulting burning mixture of fuel and air is diluted with secondary air and expanded through a turbine which drives the air compressor. In these engines, the hot mixture is expanded in the turbine in such a manner that only sufficient energy is extracted from the gases to operate the compressor. The remaining energy is employed to eject the gases in jet form through a jet pipe into the atmosphere and thereby produce thrust.

In using these fuels in turboprop engines, the operation is essentially the same except that the gases are almost completely expanded in the turbine, i.e., they are expanded almost down to the pressure of the surrounding atmosphere, leaving only a relatively small amount of energy to produce thrust when ejected through the jet pipe. Thus, in turboprop engines, the majority of the energy from the hot expanding gases is used to operate the compressor and the propeller and hence the thrust is obtained primarily from the latter.

In many turbojet and turboprop engines, only a single stage turbine is employed. However, more than a single stage may be employed and, if so, guide vanes are introduced between each pair of turbine wheels. After leaving the last turbine wheel, the gas enters the jet pipe and is discharged therefrom into the atmosphere.

In the operation of these engines using the fuels of the instant invention, the fuel and air are charged into the combustion chamber in an initial weight ratio of fuel to air which is substantially in the range of about 0.06 to about 0.11, the particular ration selected being dependent upon the power requirements at the moment. This mixture is supplemented by secondary air in an amount providing an over-all fuel to air weight ratio which does not substantially exceed 0.02 at the entrance to the turbine wheel. Fuel/air weight ratios substantially higher than 0.02 are not desirable since they result in the production of temperatures which cannot be tolerated by turbines with present materials of construction.

The use of the products of this invention provides a new method of operating jet engines having all of the advantages over prior jet fuels which are set forth earlier herein.

The fuels of the instant invention may be used advantageously in the spark ignition piston-type aircraft engine, diesel engines, and turbine engines generally, but are particularly suitable for use in ram jet turbojet and turboprop aircraft engines. However, when the piston-type and diesel engines are employed, the fuel/air ratios are adjusted so as to achieve substantially complete combustion of the air and fuel which means that these ratios fall within the limits of about 0.045 to about 0.110 and preferably within the limits of about 0.066 to about 0.08.

The fuels of the instant invention may be blended with other materials such as gasoline, kerosene, mixtures of gasoline and kerosene, other aviation fuels, and with present hydrocarbon jet fuels to produce an improved fuel over the presently available fuel. More particularly, the fuels described herein may be added to the present aliphatic hydrocarbon jet fuels having a heat of combustion of about 112,000 B.t.u.'s per gallon to raise the overall heat of combustion thereof to at least about 120,000 B.t.u.'s or 125,000 B.t.u.'s per gallon. Moreover, the fuels described herein may be used in combination with fuel additives to obtain improved results as regards burning characteristics, etc.

The heat of combustion as given in this specification represents the heat of reaction between gaseous oxygen and liquid hydrocarbon to produce gaseous carbon dioxide and water.

While this invention has been described with respect to certain embodiments, it is not so limited and it is to be understood that variations and modifications thereof which are obvious to those skilled in the art may be

What is claimed is:

1. A method of operating a turbojet engine which comprises feeding a mixture of air and a hydrogenated poly-alicyclic hydrocarbon mixture having a specific gravity of from about 0.85 at 30° C. to about 1.5 at 30° C., a pour point not substantially above 5° C., and a heat of combustion of at least 125,000 B.t.u.'s per gallon into the combustion chamber of said engine, subjecting the said mixture to combustion, passing the resulting hot gases through a turbine to expand the same and then passing the hot gases into the atmosphere by way of a nozzle, whereby thrust is produced, the said hydrogenated poly-alicyclic hydrocarbon mixture being that obtained upon hydrogenation of an unsaturated poly-alicyclic hydrocarbon obtained by the polymerization of an alicyclic diene monomer of the structure

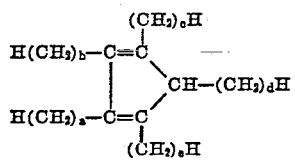

wherein $a$, $b$, $c$, $d$ and $e$ are integers from 0 to 4, inclusive.

2. The method of claim 1 wherein the unsaturated poly-alicyclic hydrocarbon is a dimer.

3. The method of claim 1 wherein the unsaturated poly-alicyclic hydrocarbon is a dimer and wherein at least 3 of the subscripts $a$, $b$, $c$, $d$ and $e$ are zero.

4. The method of claim 1 wherein the unsaturated poly-alicyclic hydrocarbon is dicyclopentadiene.

5. The method of claim 1 wherein the unsaturated poly-alicyclic hydrocarbon is methylcyclopentadiene dimer.

6. A hydrogenated poly-alicyclic hydrocarbon mixture having a specific gravity of from about 0.85 at 30° C. to about 1.5 at 30° C., a pour point not substantially above 5° C., and a heat of combustion of at least 125,000 B.t.u.'s per gallon, the said hydrogenated poly-alicyclic hydrocarbon being obtained by the hydrogenation of an unsaturated poly-alicyclic hydrocarbon obtained by the polymerization of an alicyclic diene monomer of the structure

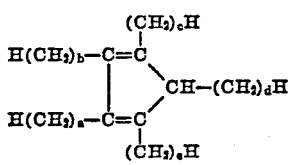

wherein $a$, $b$, $c$, $d$ and $e$ are integers from 0 to 4, inclusive.

7. A hydrogenated poly-alicyclic hydrocarbon of claim 6 wherein the unsaturated poly-alicyclic hydrocarbon is a dimer.

8. The composition of claim 6 wherein the unsaturated poly-alicyclic hydrocarbon is dicyclopentadiene.

9. The composition of claim 6 wherein the unsaturated poly-alicyclic hydrocarbon is methylcyclopentadiene.

10. A method of operating a turbojet which comprises feeding a mixture of air and a hydrogenated poly-alicyclic hydrocarbon mixture having a specific gravity of from about 0.85 at 30° C. to about 1.5 at 30° C., a pour point not substantially above 5° C., and a heat of combustion of at least 125,000 B.t.u.'s per gallon into the combustion chamber of said engine, subjecting the said mixture to combustion, passing the resulting hot gases through a turbine to expand the same and then passing the hot gases into the atmosphere by way of a nozzle, whereby thrust is produced, the said hydrogenated poly-alicyclic hydrocarbon mixture being that obtained upon hydrogenation of an unsaturated poly-alicyclic hydrocarbon obtained by the polymerization of an alicyclic diene monomer of the structure

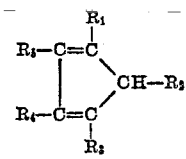

wherein $R_1$, $R_2$, $R_3$, $R_4$ and $R_5$ are alkyl radicals containing from 1 to 4 carbon atoms.

11. A hydrogenated poly-alicyclic hydrocarbon mixture having a specific gravity of from about 0.85 at 30° C. to about 1.5 at 30° C., a pour point not substantially above 5° C., and a heat of combustion of at least 125,000 B.t.u.'s per gallon, the said hydrogenated poly-alicyclic hydrocarbon being obtained by the hydrogenation of an unsaturated poly-alicyclic hydrocarbon obtained by the polymerization of an alicyclic diene monomer of the structure

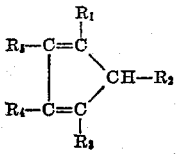

wherein $R_1$, $R_2$, $R_3$, $R_4$ and $R_5$ are alkyl radicals containing from 1 to 4 carbon atoms.

References Cited in the file of this patent

UNITED STATES PATENTS

| | | |
|---|---|---|
| 2,630,405 | Fetterly | Mar. 3, 1953 |
| 2,712,497 | Fox et al. | July 5, 1955 |
| 2,749,225 | Barnum et al. | June 4, 1956 |
| 2,765,617 | Gluesenkamp et al. | Oct. 9, 1956 |